US007243752B2

(12) United States Patent
Green et al.

(10) Patent No.: US 7,243,752 B2
(45) Date of Patent: Jul. 17, 2007

(54) DEVICE FOR INDUCTIVELY SUPPLYING POWER AND GUIDING A MOBILE OBJECT

(75) Inventors: Andrew Green, Malsburg-Marzell (DE); Frank Böhler, Grenzach-Wyhlen (DE); Roland Winterhalter, Breisach (DE)

(73) Assignee: Wampfler Aktiengesellschaft, Weil am Rhein-Märkt (DE)

( * ) Notice: Subject to any disclaimer, the term of this patent is extended or adjusted under 35 U.S.C. 154(b) by 289 days.

(21) Appl. No.: 10/956,483

(22) Filed: Oct. 1, 2004

(65) Prior Publication Data

US 2005/0103545 A1 May 19, 2005

Related U.S. Application Data

(63) Continuation of application No. PCT/EP03/01713, filed on Feb. 20, 2003.

(30) Foreign Application Priority Data

Apr. 12, 2002 (DE) ............................... 102 16 422

(51) Int. Cl.
*B62D 1/24* (2006.01)
(52) U.S. Cl. ...................... 180/168; 180/169
(58) Field of Classification Search ................ 180/167, 180/168, 169
See application file for complete search history.

(56) References Cited

U.S. PATENT DOCUMENTS 4,006,790 A   2/1977   Kawano et al.

(Continued)

FOREIGN PATENT DOCUMENTS

CA   2 403 762   9/2002

(Continued)

OTHER PUBLICATIONS

Data Sheet HG 19331-A, entitled Spürfuhrungsantenne für induktive Energieübertrgung, Götting, Feb. 19, 2002.

(Continued)

*Primary Examiner*—Christopher P. Ellis
*Assistant Examiner*—Brian Swenson
(74) *Attorney, Agent, or Firm*—Martin Fleit; Paul D. Bianco; Fleit Kain Gibbons Gutman Bongini & Bianco P.L.

(57) ABSTRACT

Device for inductive power supply and guidance of a moving object, with a primary inductance element extending as a conductive loop along a path provided for the object. A secondary inductance element is arranged on the object and can be coupled magnetically with the primary inductance element for power transmission. Several receiver inductance elements are arranged on the object and output measurement signals dependent on the magnetic field of the primary inductance element. An evaluation device determines a measure for the position of the object with reference to the conductive loop from the measurement signals. A regular arrangement of receiver inductance elements is provided, which extends on the object at least perpendicular to its direction of motion. The receiver inductance elements are simultaneously also connected to a data receiver device, which contains a way for extracting a data signal from the output voltage of at least one of the receiver inductance elements. At least one data line, which exhibits inductive coupling with at least one of the receiver inductance elements sufficient for transmitting a data signal while the object is moving, is arranged along the path provided for the object.

27 Claims, 5 Drawing Sheets

U.S. PATENT DOCUMENTS

| | | | |
|---|---|---|---|
| 4,742,283 A * | 5/1988 | Bolger et al. | 318/587 |
| 5,175,480 A * | 12/1992 | McKeefery et al. | 318/587 |
| 5,347,456 A * | 9/1994 | Zhang et al. | 701/23 |
| 5,629,595 A * | 5/1997 | Salter et al. | 318/587 |
| 5,927,657 A | 7/1999 | Takasan et al. | |
| 6,336,064 B1 * | 1/2002 | Honkura et al. | 701/23 |
| 6,437,561 B1 * | 8/2002 | Bartingale et al. | 324/207.22 |

FOREIGN PATENT DOCUMENTS

| | | |
|---|---|---|
| DE | 31 50 380 | 9/1987 |
| DE | 39 16 610 | 12/1989 |
| DE | 40 20 548 | 1/1992 |
| DE | 690 31 578 | 4/1998 |
| DE | 196 49 682 | 6/1998 |
| DE | 198 16 762 | 10/1999 |
| DE | 100 14 954 A1 | 10/2001 |
| JP | 07-061350 | 3/1995 |
| JP | 07-067270 | 10/1995 |
| JP | 07-067271 | 10/1995 |
| JP | 08-033112 | 2/1996 |
| WO | PCT/EP2003/001713 | 7/2004 |

OTHER PUBLICATIONS

Data Sheet HG 751, entitled "Induktiv-Modem" Götting KG, Lehrte/ Roddensen, Sep. 16, 1998.

System description ,entitled Spürfuhrungssystem HG895, Götting Mar. 11, 1999.

System description ,entitled Spürfuhrungssystem für leitdrahtgefuhrte Fahrzeuge im AuBenbereich G21934, Götting Apr. 7, 2000.

* cited by examiner

DEVICE FOR INDUCTIVELY SUPPLYING POWER AND GUIDING A MOBILE OBJECT

RELATED APPLICATION

This application is a continuation of International Application PCT/EP03/01713, filed Feb. 20, 2003, the contents of which are here incorporated by reference in their entirety. Applicants claim the benefit of 35 USC §120.

BACKGROUND OF THE INVENTION

1. Field of the Invention

The invention pertains to a device for inductively supplying power and guiding a mobile object.

2. Prior Art

The inductive transmission of power enables power to be supplied to a mobile load without mechanical or electrical contact. Devices provided for this purpose, like those known, e.g., from WO 92/17929, include a primary part and a secondary part, which are electromagnetically coupled similarly in principle to a transformer. The primary part consists of supply electronics and a conductor loop laid along a path with forward and return conductors, which extend parallel to each other and transition into each other or are connected to each other at the end of the path. One or more pickups arranged on mobile loads and the associated pickup circuitry form the secondary part. In contrast to transformers of typical construction, this is a loosely coupled system, which is operated at a relatively high frequency in the kilohertz range and can bridge large air gaps up to a few centimeters. The advantages of this type of power delivery include, especially, freedom from wear and tear and maintenance, as well as contact safety and good availability. Typical applications include not only automatic material transport systems in manufacturing technology but also human transport systems, such as elevators and electric buses.

In such a device, because the path over which the load moves may not deviate from the course of the conductor loop, the load must be guided accordingly if it is not a rail-bound vehicle. Such guidance can be realized, e.g., such that the vehicle has a turning front axle, whose angular position is determined directly by a control surface, which slides in a groove running in the vehicle. Here, the pickup is advantageously arranged on this articulated front axle, so that it is always aligned as best as possible to the conductor loop embedded in the travel surface, even along curves. Disadvantages of this solution include the labor required to cut the groove, the unevenness of the travel surface, and the inevitable mechanical wear of the control surface.

One elegant solution, which avoids these disadvantages, is the noncontact inductive guidance described in DE 198 16 762 A1. In this way, the magnetic field transmitted by the conductor loop is detected by an inductive sensor arrangement, whose output signals are supplied to an evaluation device, which determines from these signals the position of the vehicle in the transverse direction to the conductor loop and controls servomotors as a function of this position for steering the vehicle. The provided sensor arrangement is arranged in the center in the vehicle and consists of one sensor with vertical and horizontal sensitivity axes, where the latter runs perpendicular to the direction of travel. Because the current in the forward and return conductors of the conductor loop is equal and opposite at every point in time, in the center position of the vehicle with reference to the conductor loop, the signal of the sensor with a vertical sensitivity axis reaches a maximum while the signal of the other sensor is null.

Frequently, in automatic transport systems there is the need for data communication between the vehicles and a central control station. For this purpose, from DE 39 16 610 A1, a device for simultaneous track guidance and data transmission is known, wherein, however, the track-guidance conductor is used exclusively for track guidance and not for supplying power to the vehicle. The sensor arrangement provided for track guidance completely agrees with the previous description, while the transmitter and receiver device for data communication is not explained in more detail.

SUMMARY OF THE INVENTION

Starting from this state of the art, the invention is based on the problem of presenting an advantageous way to realize data communication as an additional function of a device for inductively supplying power and guiding a mobile object.

The problem is solved according to the invention by a device with the features given in claim 1. Advantageous configurations of the invention follow from the subordinate claims.

One essential advantage of the invention is that the inductances otherwise necessary for determining the position on the moving load are simultaneously used for data reception, i.e., only a single inductive antenna is needed for both guidance and data reception. Here, an arrangement of two rows of flat coils, which are offset relative to each other and which are arranged on the moving load transverse to the direction of motion and with the vertical axis direction, is especially suitable. Such flat coils can be easily mounted on a printed-circuit board, and, in the extreme case, they could even be realized completely planar on a printed-circuit board.

i) When this receiver coil arrangement is wide enough to cover at least one of the conductors of the conductor loop used for power transmission on the sides, and the data line is adjacent to a line of the loop, even in curved section of the path over which the load moves, both a precise position determination and also a coupling of at least one receiving inductance with the data line sufficient for noise-free data reception is always guaranteed. This also applies when the antenna cannot be arranged in the center of the articulated front axle of the moving load and thus experiences a lateral deflection in a curve. Here, the line position can be determined very precisely from a comparison of the measurement signals of the individual receiver coils or from an interpolation of the amplitude profile between the individual receiver coils.

In principle, the receiving inductances could also be used for transmitting data signals, but it appears to be more advantageous to provide for this purpose a separate arrangement of inductances with ferromagnetic cores to concentrate the field better to the data line, wherein, here, two rows of inductances offset relative to each other also represent an especially preferable solution. Both in terms of the transmitting inductances and also the receiving inductances, the one that features the best coupling for the data line due to their instantaneous lateral position is selected for the communication operation on the basis of the result of the position determination. This process can be applied, in principle, to any inductive antenna arrangement with several transmitter and/or receiver coils.

BRIEF DESCRIPTION OF THE DRAWINGS

In the following, embodiments of the invention are described with reference to the drawings. Shown here are.

DETAILED DESCRIPTION OF PREFERRED EMBODIMENTS OF THE INVENTION

Figure 1:
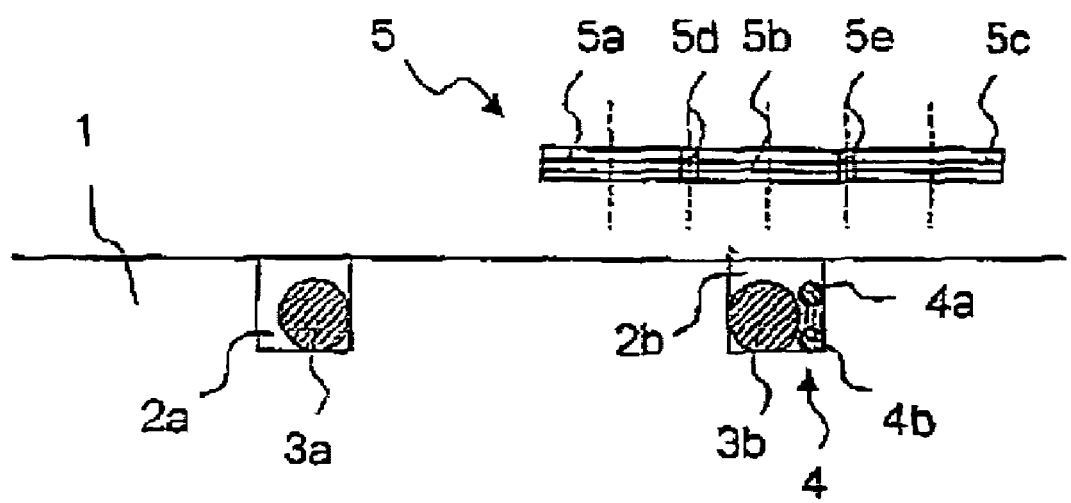
FIG. 1, a schematic cross-sectional view of a part of a device according to the invention, FIG. 2, a schematic top view of the part of the device according to FIG. 1, FIG. 3, the profile of the output voltage of a receiving inductance as a function of the position perpendicular to the direction of motion, FIG. 4, an enlarged and simplified cut-out of a view as in FIG. 1, FIG. 5, two variants of a transmitting inductance for the device according to the invention, FIG. 6, a schematic cross-sectional view of an arrangement of inductances suitable for bidirectional communication, FIG. 7, a schematic top view of the arrangement according to FIG. 6, FIG. 8, a block circuit diagram of an evaluation, receiver, and transmitter device for operation in connection with the inductance arrangement of FIGS. 6 and 7.
Figure 2:
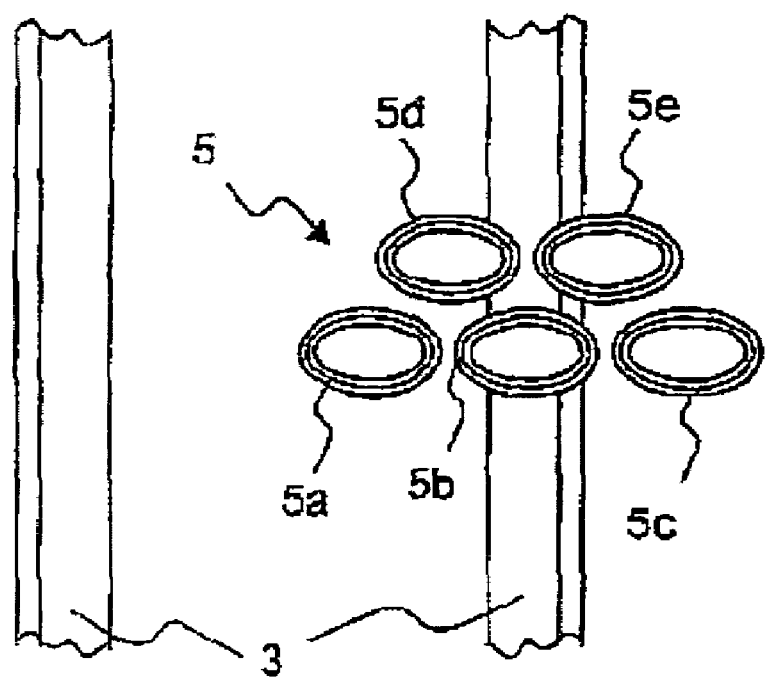

In FIGS. 1 and 2, a part of a device according to the invention is shown schematically in cross section and in top view, respectively. Two grooves 2a and 2b are cut into a track 1, on which an electric transport vehicle is to move. The forward conductor 3a and the return conductor 3b of a conductor loop 3 are embedded in these grooves 2a and 2b. Only a short section of this loop can be seen in FIG. 2. The conductor loop 3 is powered by power supply electronics (not shown) and acts as a spatially distributed primary inductance of a transformer, whose secondary inductance is formed by a load mounted on the vehicle. In this way, the vehicle is supplied with the electrical energy required for its operation. The load and the vehicle are not of interest here and are thus not shown in the figures. Typical operating parameters of such a system are 100 mm for the primary line center spacing, 10 mm for the air gap, 100 A for the current, and 20 kHz for the frequency.

In addition, another two-wire data line 4 with the wires 4a and 4b is arranged in the groove 2b. Here, the data line 4 in cross section is perpendicular to the plane defined by the conductor loop 3, i.e., the line connecting the center points of the wires 4a and 4b is perpendicular to the line connecting the center points of the conductors 3a and 3b. In this way, not only an optimum inductive decoupling of the data line 4 from the conductor loop 3 is achieved but a laying of the data line 4 in curves is simplified since the data line 4, embodied as a flat two-wire line, is significantly more flexible in this direction than the other. The two grooves 2a and 2b have the same cross section for the sake of simplicity so that, if necessary, room for another data line is still available in the groove 2a. For the present invention, it does not matter on which one side of the conductors 3a or 3b the data line 4 is placed. Thus, a vertical arrangement on the inside or also a horizontal arrangement above a conductor 3a or 3b is also just as good as the vertical arrangement on the outer side as shown in the figures.

An inductive receiver antenna 5 consisting of five flat coils 5a-5e is mounted on the not-shown vehicle, at a distance on the order of 10 mm from the surface of the track 1. The coils 5a-5e all lie parallel to each other and with the end surfaces parallel or with the axes as indicated by the dashed lines in the figures perpendicular to the surface of the track 1. The coils 5a-5e form a straight line, which extends perpendicular to its direction of motion, which then agrees with the longitudinal direction of the conductor loop 3, for the correct orientation of the vehicle. This likewise applies to the coils 5d and 5e, which are shifted both in the longitudinal direction of the return conductor 3b and also in the transverse direction relative to the coil row 5a-5c. The shift in the longitudinal direction corresponds to somewhat more than the dimension of a coil in this direction. The shift in the transverse direction corresponds to half the dimension of a coil in this direction. The representation of the coils with an oval cross section in FIG. 2 is meant purely as an example, i.e., the cross section could as well be circular or approximately rectangular. The cross-sectional dimensions of the coils could be, e.g., on the order of 10-30 mm.

The receiver coils 5a-5e are initially set to measure the magnetic field of the current in the conductor loop 3 in order to determine the position of the antenna 5 and, thus, also the vehicle on which it is mounted, perpendicular to the direction of motion. For this purpose, the coils 5a-5e are connected to an electronic evaluation device, which sets, compares, evaluates the amplitudes of the voltages induced by the aforementioned magnetic field in the coils 5a-5e, and determines a measure for the position of the antenna 5 to the return conductor 3b. Based on this position determination, control signals for one or more servomotors are generated by a controller in order to steer the vehicle automatically along a path, which follows the course of the conductor loop 3.

Figure 3:
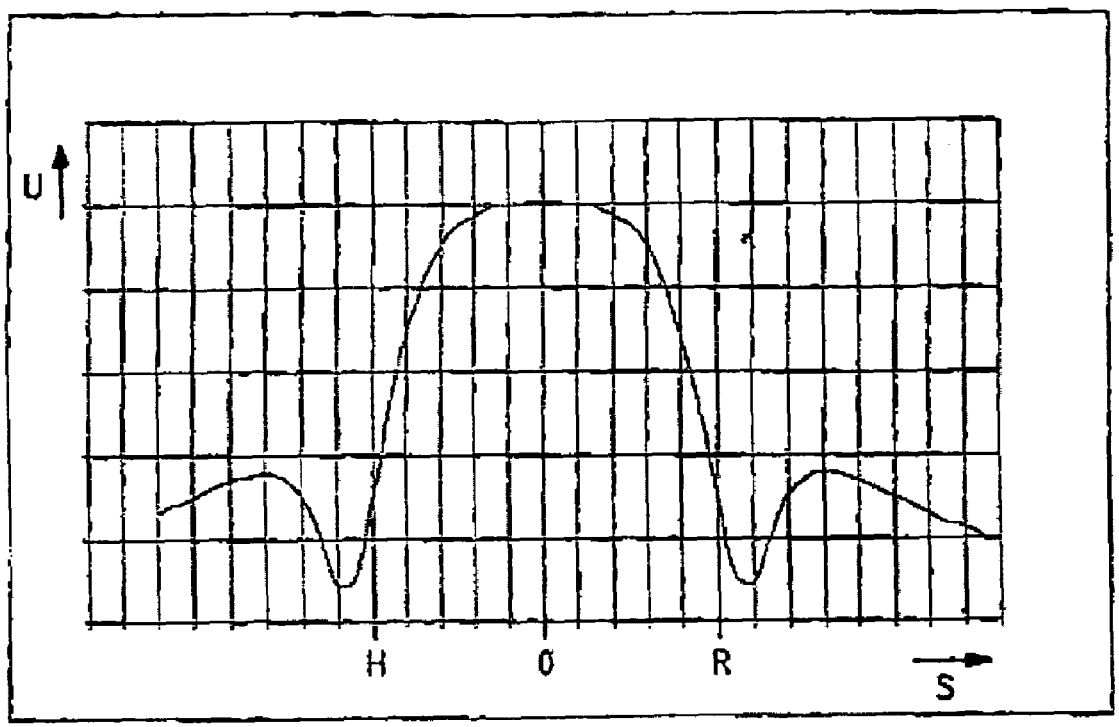

The position determination touches upon the fact that the amplitude of the induced voltage U exhibits a characteristic profile with several extreme values at a constant vertical distance as a function of the lateral position S of a receiver coil 5a-5e. In FIG. 3, this profile is shown qualitatively reproducing the field diagram of a double line with two wires carrying current flows of opposite sense. Here, the origin of the abscissa lies exactly in the center between the forward conductor 3a and the return conductor 3b. The positions of the conductor 3a and 3b are specified in FIG. 3 by H and R, respectively. Due to the known profile of the magnetic field lines as loops, whose center points each lie on the line connecting the two wires, but are all outside of the intermediate space H-R, two symmetric minimum values are produced at positions approximately at the positions of H and R. At such a minimum, the interlinked flux is nearly zero due to the horizontal profile of the field lines at this point. The maximum lies exactly in the center and results from the addition of equally large positive field contributions from both wires.

It is clear that such a profile can be used in a simple way for position determination by searching for the extreme value, in that several coils are arranged along the path S and their output voltages are compared and evaluated in an electronic evaluation device. Here, the minimum values are more favorable as criteria due to the significantly steeper curve profile in their vicinity. Because only discrete points can be sampled along the path S with the coil arrangement, it is proposed to perform nonlinear interpolation on the curve profile according to FIG. 3 between these reference points. The offset of the two coil rows 5d-5e relative to the first row 5a-5c by half the transverse dimension of a coil halves the spatial scanning interval relative to the first coil row 5a-5c.

However, the radius of curvature of the conductor loop 3 in the curves of the vehicle path must be large relative to the distance of the two coil rows 5a-5c and 5d-5e in the longitudinal direction, so that the errors caused by this longitudinal spacing do not ruin the gain in accuracy in curves. A lateral curvature of the conductor loop 3 in a curve or at a branch point of two paths—which is called a switchpoint below, following conventional terminology in connection with rail-bound systems—makes itself noticeable in that the location of a minimum determined by the evaluation device begins to wander out to the side. This deviation of the current position from a desired position predetermined by the position of the antenna 5 on the vehicle can be used for path regulation of the vehicle.

Another function of the antenna 5 is the inductive reception of data signals, which are transmitted to the vehicle by a central controller (not shown) over the data line 4 arranged directly next to the return conductor 3b. The position of the data line 4 to two flat receiver coils 5d and 5e each with vertical axes is shown enlarged in FIG. 4. Due to the relatively large distance between the two conductors 4a and 4b in the range of 10-20 mm, it has a relatively large intrinsic impedance and is comparable to a 300 Ω antenna cable of an earlier conventional type. A thin connecting piece of insulation mechanically connects the two conductors 4a and 4b and holds them with an overall, constant spacing.

When the current in the data cable 4, as indicated by the cross and the point in the conductors 4a and 4b, flows backwards in the top conductor 4a through the shown cross-sectional plane and forwards in the bottom conductor 4b at a certain time, thus in the space between the line 4 and the receiver coils 5d and 5e, there is a magnetic field profile of the shown type, i.e., the field lines run in the clockwise direction circular around center points, which lie above the top conductor 4a on the line connecting the conductor center points. At two points of the sketched field line B, the horizontal components $B_H$ and the vertical components $B_V$ of the magnetic flux density are illustrated as examples.

For an exact centered position of a receiver coil 5d or 5e above the data cable 4, the inductive coupling assumes a minimum due to the purely horizontal profile of the magnetic field B at this point, i.e., it theoretically disappears at this point. On the other hand, the magnitude of the flux density B decreases with increasing distance of a coil 5d or 5e from the line 4. From this fact, it follows that a maximum of the inductive coupling appears at a given vertical distance between coil 5d or 5e and the upper line 4a in the vicinity of the data line 4, but away from the aforementioned centered position. For the use of a regular arrangement of a plurality of receiver coils 5a-5e, as shown in FIG. 2, obviously one of the receiver coils 5a-5e always lies closest to this maximum and thus is best suited for receiving data.

Accordingly, the mentioned evaluation device always selects the best positioned receiver coil 5a-5e for the position determination and connects only this coil to the data receiver device via a multiplexer. In this way, as the vehicle moves, the selection of the most favorable receiver coil 5a-5e changes repeatedly, especially during a change in direction in a curve or at a switchpoint, where the receiver antenna 5 temporarily wanders out to the side from its normal position relative to the conductor loop 3 and thus also relative to the data line 4 despite steering control. The latter is even unavoidable when the antenna can be placed eccentrically under the articulated front axle of the vehicle. However, through the constant switching of the best-lying receiver coil 5a-5e, problem-free data reception is guaranteed also in nonstraight sections of the path.

Figure 5:
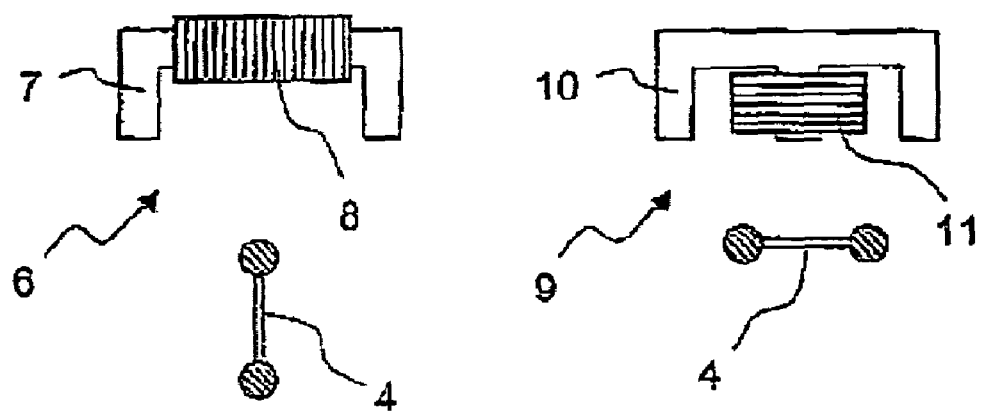

In principle, an antenna 5 of the type previously described could also be used inductively to transmit data from the vehicle on which it is mounted via the data line 4 to a central control station. To increase the efficiency of the transmission, however, it is advantageous to use separate transmitter coils with a ferromagnetic core for field concentration on the data line 4. In FIG. 5, two possible models of such transmitter coils 6 and 9 are shown.

Figure 4:
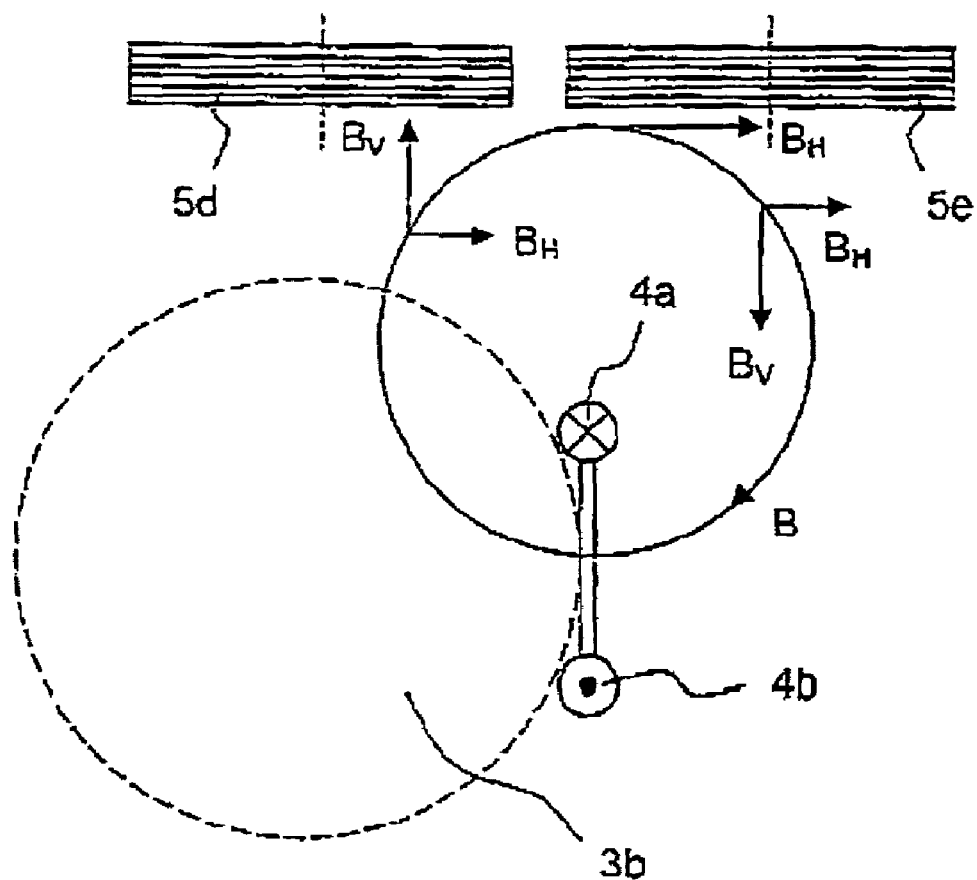

The left transmitter coil 6 is especially suited for use in a data line 4 with vertical conductors 4a and 4b lying one above the other, as already shown in FIGS. 1 and 4. The iron core 7 is U-shaped in this case, and the coil 6 is mounted on the vehicle so that the two legs of the U-core 7 point vertically to the data line 4. The winding 8 is located on the horizontal section between the two legs. The inductive coupling is at a maximum in the shown centered position of the coil 6 over the data line 4 in this arrangement.

The right transmitter coil 9 is especially suited for use in a data line 4 with horizontal conductors 4a and 4b lying one next to the other. This conductor arrangement is less optimal than the vertical arrangement in terms of undesired inductive coupling between the data line 4 and the conductor loop 3 and also in terms of mechanical flexibility in horizontal curves of the line composite, but in principle it also comes into consideration. The iron core 10 is in this case E-shaped, and the coil 9 is mounted on the vehicle so that the three legs of the E-core 10 point vertical to the data line 4. The winding 11 is located on the center leg. The inductive coupling is also in this arrangement at a maximum in the shown centered position of the coil 9 over the data line 4.

In complete analogy to the receiver antenna 5, an inductive transmitter antenna consists of a plurality of regular linear transmitter coils arranged perpendicular to the direction of motion of the vehicle in order to guarantee that there is always a transmitter coil sufficiently well positioned for noise-free data transmission to the data line 4, i.e., even when traveling through a curve. In addition, the advantage of an arrangement of two rows of coils lying one behind the other and offset to the side relative to each other for increasing the position resolution can be directly transferred from the receiver antenna 5 to a transmitter antenna. Logically, a transmitter antenna must be mounted at the same position in the transverse direction of the vehicle like the receiver antenna 5, so that it must be shifted in the longitudinal direction relative to the receiver antenna.

The selection of the best transmitter coil for a fixed spatial allocation between the receiver and transmitter coils can be made on the basis of the selection of the best receiver coils. In this way, for a longitudinal offset of the transmitter antenna relative to the receiver antenna, the best transmitter coils are not necessarily located in the same lateral position as the best receiver coil, but instead, in a curved section of the path, the transmitter coil in the most favorable position can be offset to the side relative to the best receiver coil. A consideration of this effect in selecting the transmitter coil requires a temporary storage of path data by the evaluation device.

Figure 6:
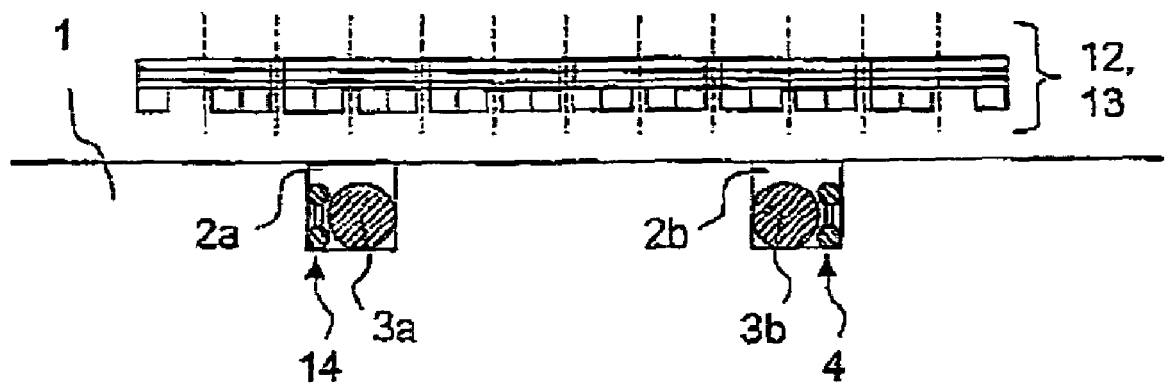
Figure 7:
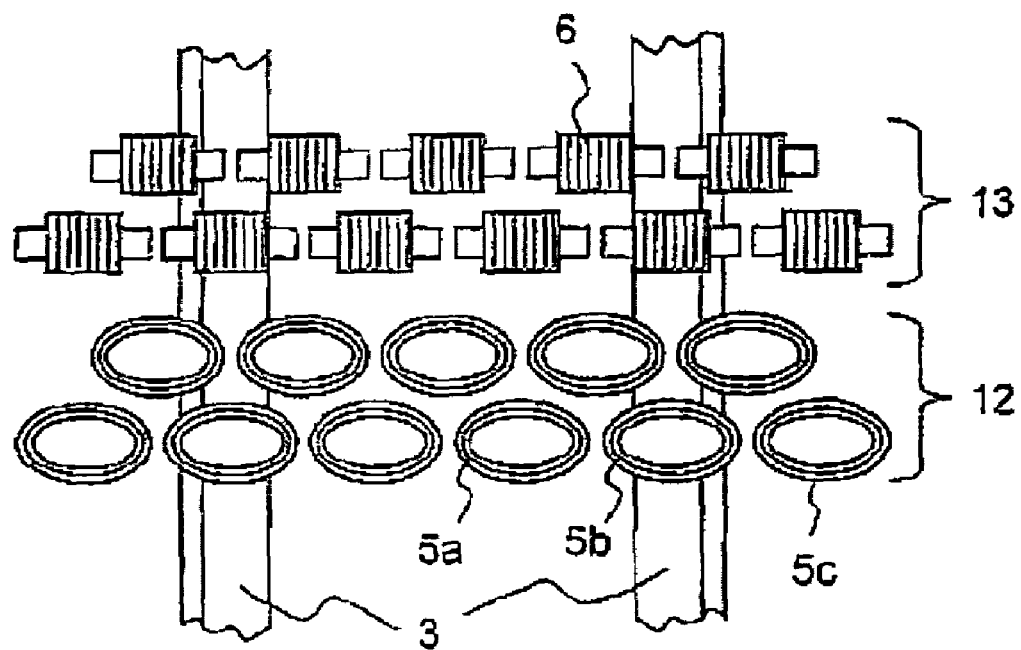

In FIGS. 6 and 7, a guidance and communications system according to the invention is shown with a maximum functional extent in the cross section or in the top view. It has a receiver antenna 12, which corresponds in principle to the antenna previously described with reference to FIGS. 1 and 2, but it differs not only in the return conductor 3b, but also in the forward conductor 3a, thus the conductor loop 3 is covered over its full width. Shifted in the longitudinal direction relative to the receiver antenna 12 is an analogously structured transmitter antenna 13, which in the same way completely covers the conductor loop 3 and is assembled from transmitter coils 6 of the type shown on the left in FIG. 5. As can be seen in FIG. 6, a second data line 14 also in a vertical position is located in the groove 2a adjacent to the forward conductor 3a.

The advantage of the system according to FIGS. 6 and 7 is the functionality also in the region of switchpoints (path branches), at which the vehicle and, thus, also the antennas 12 and 13 are at a distance from one of the conductors 3a or 3b, and temporarily only one of the conductors 3a or 3b is still present in the vicinity of the antennas 12 and 13. Therefore, because data lines 14 and 4 are assigned to each of the conductors 3a and 3b, respectively, and because each of these data lines 14 and 4 is covered by the receiver and transmitter antennas 12 and 13, respectively, noise-free data communication is possible at any point in time.

The same also applies accordingly to the track guidance of the vehicle. Namely, as shown in FIGS. 1 and 2, if only one of the conductors 3a or 3b is covered by a receiver antenna 5 and the track of the vehicle is at a distance from this conductor at a switchpoint, then no position determination and, consequently, no steering control is possible until the antenna 5 once again finds a new conductor 3a or 3b. In contrast, for an antenna arrangement as in FIGS. 6 and 7, the receiver antenna 12 is always close to at least one conductor 3a or 3b, and thus uninterrupted position information is also guaranteed in the region of a switchpoint.

If these viewpoints are not a decisive factor in the particular application, then for bidirectional data communication, in principle, one half of the antenna arrangement 12, 13 shown in FIGS. 6 and 7 is sufficient and the second data line 14 can be eliminated. This corresponds to the arrangement of FIGS. 1 and 2 with two additional rows of transmitter coils 6, which are offset relative to each other in the transverse direction and which lie in the longitudinal direction behind the receiver coils 5a-5e. It is obvious that the number of five receiver coils 5a-5e in two rows shown in FIGS. 1 and 2 and the number of eleven transmitter and receiver coils in two rows shown in FIGS. 6 and 7 are only an example. In the particular application, for achieving the desired performance data, both a smaller number of coils and/or rows can be sufficient and also a greater number of coils and/or rows may be necessary.

Figure 8:
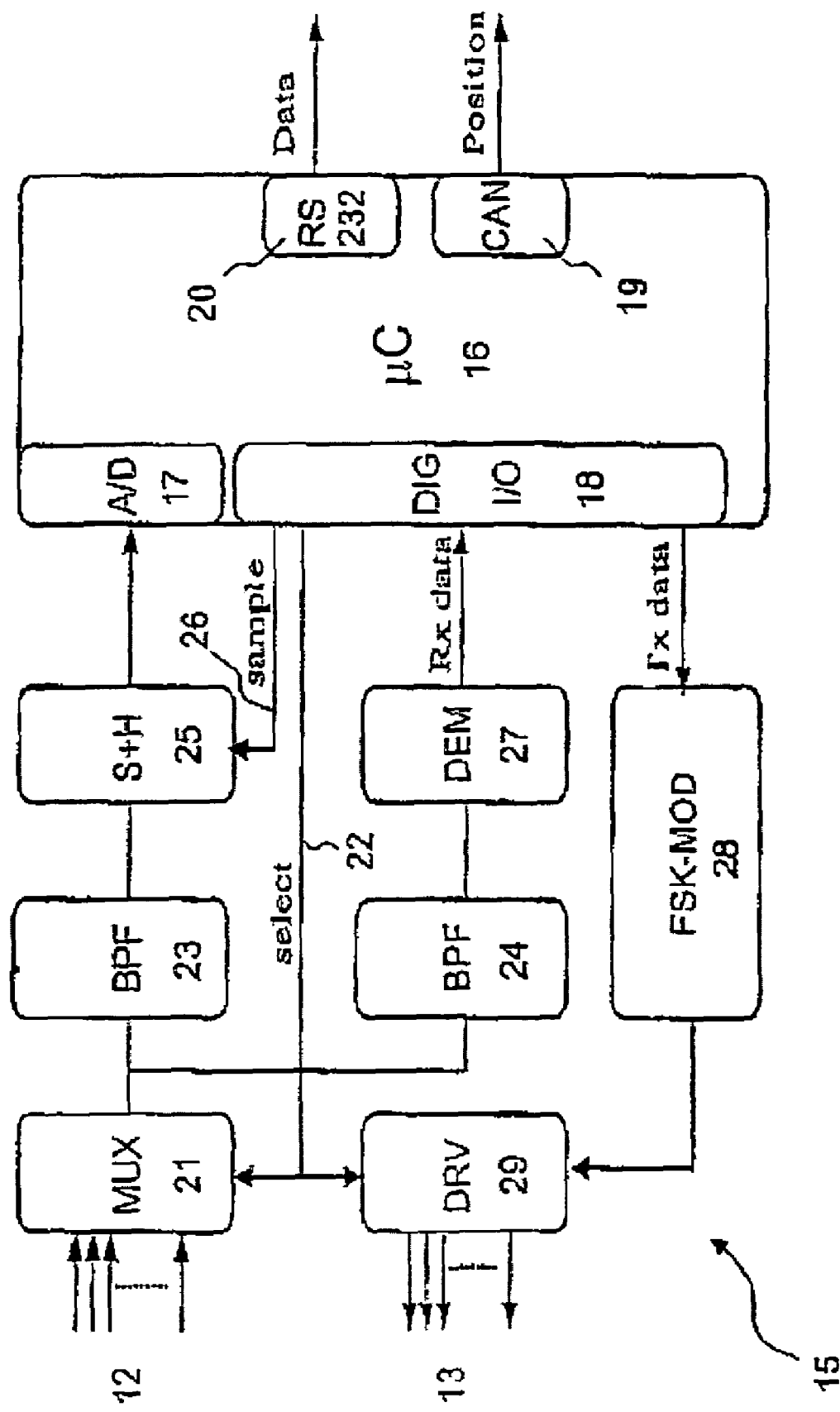

The block circuit diagram of a combined evaluation and data communication device 15 is shown in FIG. 8. The core of this device 15 is a microcomputer 16, which monitors all of the digital processing functions of the device 15. The microcomputer 16 provides an analog/digital converter 17 for reading the analog position measurement signals detected by the receiver antenna 12 and a digital input/output unit 18 for reading the digital data signals received via the receiver antenna 12 from the data lines 4 and 14, as well as for the output of digital data signals, which are to be transmitted via the transmitter antenna 13 to the data lines 4 and 14. The microcomputer 16 further provides suitable digital interfaces for communication with the control electronics of the vehicle. For example, to transmit the calculated position data to the steering control unit, a separate CAN bus interface 19 can be provided, while to output control commands, as well as to read status information, which is to be transmitted over the data lines 4 and 14 to a central control station, a series RS232 interface is used. As an alternative to the mentioned interface types, e.g., RS485 is also suitable.

The receiver antenna 12 is connected to the device 15 via a multiplexer 21, which is controlled by the microcomputer 16 via a control bus 22. Thus, only a single receiver coil connection to the receiver antenna 12 is always selected over the control bus 22 and switched through by the multiplexer 21 to its output. Two bandpass filters 23 and 24 are connected in parallel to the output of the multiplexer 21. While the bandpass filter 23 is tuned to the operating frequency of the conductor loop 3, which is used for power transmission and which lies, e.g., on the order of 20 kHz, the bandpass filter 24 is tuned to the frequency band which is selected for data transmission on the data lines 4 and 14 and which, e.g., can lie on the order of around 1 MHz. These bandpass filters 23 and 24 separate the position measurement signal originating from the magnetic field of the conductor loop 3 and the data signal output from the data lines 4 and 14.

The position measurement signal from the first bandpass filter 23 is then supplied to a sample-and-hold unit 25, which is controlled by the microcomputer 16 via additional control lines 26 like the multiplexer 21. The output of the sample-and-hold unit 25 is connected to the input of the A/D converter 17. The data signal from the second bandpass filter 24 is then supplied to a demodulator 27, which recovers the digital base band signal from this data signal and outputs it to the digital input/output interface 18 of the microcomputer 16.

A digital modulator 28 forms the counterpart to the demodulator 27. Data to be transmitted from the vehicle to the control station is supplied to this modulator as a base band signal from the digital input/output interface 18 of the microcomputer 16, which modulates it onto a carrier signal, e.g., through frequency shift keying (FSK). The transmitter signal generated in this way outputs it to a driver unit 29, to which the transmitter antenna 13 is connected. This driver unit 29 amplifies the data signal coming from the modulator 28 and switches it onto only one transmitter coil connection of the transmitter antenna 13 under the control of the microcomputer 16 applied on the control bus 22. Thus, the driver unit 29 itself includes another multiplexer not shown separately in FIG. 8. To guarantee sufficient switching rates, the control bus 22 includes separate address lines for the multiplexer 21 and the other multiplexer contained in the driver unit 29.

The selection of the transmitter and receiver coil used at a certain time is made by the microcomputer 16 with reference to the position of the antennas 12 and 13 calculated by it. This calculation includes the position measurement signals of all receiver coils of the receiver antenna 12, which are switched through and read one after the other via the multiplexer 21. Thus, for the data communication, only the transmitter and receiver coil with the most favorable position is always used. Here, the amplitudes of the data signals delivered by the individual receiver coils of the receiver antenna 12 could also be used as selection criteria, i.e., the associated output signals of the bandpass filter 24 are used, but it is preferable to use the position signals, i.e., the assigned output signals of the bandpass filter 23, because these signals are significantly stronger due to the orders of magnitude higher current in the conductor loop 3 relative to the data lines 4 and 14.

The receiver antenna 12 can also be used to receive signals from transmitters arranged at predetermined positions along the conductor loop 3 for position marking. Such position mark transmitters are typically used to signal to an automatically controlled vehicle that it has reached or passed predetermined positions along a path. Preferably, such a transmitter provides a transmitter coil, which is arranged next to the conductor loop 3 so that at least one of the coils of the receiver antenna 12 is led into inductive coupling temporarily when the vehicle passes, whereby for a short time the transmission of a data signal from the stationary transmitter coil to the receiver antenna 12 is possible.

This data signal includes a digital code, which indicates the position of the transmitter along the conductor loop 3. To prevent disruption of this unidirectional position data transmission through the existing fields for power transmission from the conductor loop 3 to the vehicle and for data transmission between the data line (4,14) and the vehicle, the frequencies or frequency bands of the three fields must be sufficiently clearly differentiated, i.e., the extraction of the position data signal by another bandpass filter, in addition to the filters 23 and 24, must be possible. Obviously, another demodulator must also be connected to the output of the bandpass filter, which corresponds to a duplication of the center signal path 24-27-18 in FIG. 8. The decoding and forwarding of the position mark data can be performed without additional means by the microcomputer 16 as an additional function.

At a predetermined lateral distance of the position mark transmitter from the conductor loop 3, after the selection of the best receiver coil for receiving the data signal from the data line (4,14), the best receiver coil can also be determined in a simple way for receiving the other data signal from one of the position mark transmitters, wherein under all circumstances this process concerns two different receiver coils. The receiver antenna 12 can even be used to receive three different signals quasi-simultaneously.

The invention represents a combined system for inductively supplying power and guiding a mobile object with simultaneous inductive data communication, with which in each case the minimum requirements (single-master, half-duplex, 9600 baud transmission rate, 100 ms reaction time) imposed today on data communication in terms of the present invention can be fulfilled. However, the performance data of the system can be adapted without additional means to an increased need. This applies not only for the transmission speed and the reaction time. Thus, the provision of a second data line 14, as was described with reference to FIGS. 6 and 7, also opens up the possibility of full-duplex operation.

Although it is preferable that at least the receiver antenna, the transmitter antenna, and the evaluation and data communication device each form a single module, or even that all of these components are integrated into a single module, this is not a requirement for realizing the present invention. The use of a plurality of separate coils and the realization of the evaluation device and the data receiver device as integral components of central control electronics for the vehicle represent embodiments of the invention, which are included in the protected scope of the claims.

What is claimed is:

1. Device for inductive power supply and guidance of a moving object, comprising:
   a primary inductance element extending as a conductive loop along a path provided for the object,
   a secondary inductance element arranged on the object and coupled magnetically with the primary inductance element for power transmission,
   a plurality of receiver inductance elements arranged on the object and which output measurement signals dependent on the magnetic field of the primary inductance element, and
   an evaluation device, which determines a measure for the position of the object with reference to the conductive loop from the measurement signals, wherein a regular arrangement of receiver inductance elements is provided, which extends on the object at least perpendicular to object's direction of motion, in that the receiver inductance elements are simultaneously also connected to a data receiver device, which contains means for extracting a data signal from the output voltage of at least one of the receiver inductance elements, and in that at least one data line, which exhibits inductive coupling with at least one of the receiver inductance elements sufficient for transmitting a data signal from a controller to the object while the object is moving, is arranged along the path provided for the object.

2. Device according to claim 1, wherein the data line is identical to the conductive loop.

3. Device according to claim 1, wherein the data line is embodied separately from the conductive loop.

4. Device according to claim 1, wherein the receiver inductance elements are similar coils, which are arranged so that their longitudinal axes run parallel to each other, and in that the axial ends of all of the coils lie in at most two parallel planes.

5. Device according to claim 4, wherein the coils are realized in a planar configuration as conductor tracks on a printed circuit board.

6. Device according to claim 4, wherein the coils are arranged on the object so that their longitudinal axes run approximately perpendicular to the tangential plane of the path of the object.

7. Device according to claim 1, wherein the arrangement of receiver inductance elements also extends in the direction of motion of the object.

8. Device according to claim 7, wherein at least two rows of coils are provided one after the other in the direction of motion of the object and these rows are offset relative to each other in the transverse direction by the transverse dimension of one of the coils divided by the number of rows.

9. Device according to claim 1, wherein the evaluation device determines at least one extreme of the induced measurement signal as a function of position as a measure for the position of the object with reference to the conductive loop.

10. Device according to claim 9, wherein the evaluation device performs non linear interpolation between the measurement signals of several coils for determining at least one extreme value.

11. Device according to claim 9, wherein the transmitter inductance elements cover the entire width of the conductive loop.

12. Device according to claim 1, wherein a data transmitter device is provided on the object and is connected to at least one transmitter inductance element, which exhibits inductive coupling with the data line sufficient for transmitting a data signal.

13. Device according to claim 12, wherein the at least one transmitter inductance element is identical to receiver inductance elements connected to the evaluation device.

14. Device according to claim 12, wherein on the object there is a regular arrangement of a plurality of transmitter inductance elements, which extend at least perpendicular to the direction of motion of the object and which are embodied separately from the receiver inductance elements connected to the evaluation device.

15. Device according to claim 14, wherein the transmitter inductance elements are similar coils, which each have a ferromagnetic core, which is shaped and arranged so that the inlet and outlet surfaces of the magnetic flux extend approximately perpendicular to the tangential plane of the path of the object.

16. Device according to claim 14, wherein the arrangement of transmitter inductance elements also extends in the direction of motion of the object.

17. Device according to claim 16, wherein at least two rows of transmitter inductance elements are provided one after the other in the direction of motion of the object and in that these rows are offset relative to each other by the transverse dimension of a single transmitter inductance element divided by the number of rows.

18. Device according to claim 12, wherein the evaluation device selects one of the transmitter inductance elements, which is located in the position of maximum coupling with the data line, with reference to the measurement signals supplied by the receiver inductance elements at each point in time for the data transmission and in that the selected transmitter inductance element is used for transmitting a data signal at each point in time.

19. Device according to claim 1, wherein the evaluation device selects one of the receiver inductance elements, which is located in the position of maximum coupling with the data line, with reference to the measurement signals supplied by the receiver inductance elements at each point in time for data transmission and in that the selected receiver inductance element is used for receiving a data signal at each point in time.

20. Device according to claim 1, wherein the data line consists of two conductors, which are arranged adjacent to one of the two conductors of the conductive loop, so that in cross section the line connecting the conductor center points of the data line is approximately perpendicular to the line connecting the conductor center points of the two conductors of the conductive loop.

21. Device according to claim 1, wherein there are two data lines, of which one is adjacent to an outgoing line and one is adjacent to a return line of the conductive loop.

22. Device according to claim 1, wherein the receiver inductance elements cover the entire width of the conductive loop.

23. Device according to claim 1, wherein the data receiver device includes means for extracting another data signal from the output voltage of at least one of the receiver inductance elements and in that along the path provided for the object there is at least one data transmitter, which transmits another such data signal by means of a transmitter inductance element, which exhibits inductive coupling with at least one of the receiver inductance elements sufficient for transmitting the other data signal only while the object is passing by.

24. Device according to claim 23, wherein the data transmitter transmits a code giving its position along the conductive loop.

25. Device according to claim 23, wherein the data transmitter transmits in a frequency band, which differs significantly both from the operating frequency of the power supply and also from the frequency band of the data transmission between the object and the data line, and in that for extracting the other data signal from the output voltage, at least one of the receiver inductance elements has its own filter device.

26. Device for inductive power supply and guidance of a moving object, comprising:
    a primary inductance element extending as a conductive loop along a path provided for the object,
    a secondary inductance element arranged on the object and coupled magnetically with the primary inductance element for power transmission,
    a plurality of receiver inductance elements arranged on the object and which output measurement signals dependent on the magnetic field of the primary inductance element, and
    an evaluation device, which determines a measure for the position of the object with reference to the conductive loop from the measurement signals, wherein a regular arrangement of receiver inductance elements is provided, which extends on the object at least perpendicular to the object's direction of motion, in that the receiver inductance elements are simultaneously also connected to a data receiver device, which contains means for extracting a data signal from the output voltage of at least one of the receiver inductance elements, and in that at least one data line, which exhibits inductive coupling with at least one of the receiver inductance elements sufficient for transmitting a data signal while the object is moving, is arranged along the path provided for the object,
    wherein the frequency band used for the data transmission differs significantly from the operating frequency of the power supply and in that there is at least one filter device for separating the position measurement signals and the data signals.

27. Method for inductive data transmission between a stationary data line and a moving object, which is guided along a path extending parallel to the data line, wherein the position of the object perpendicular to the direction of motion is measured and used for path guidance, characterized in that on the object there is a receiver and/or a transmitter antenna, which consists of a plurality of individual receiver or transmitter inductance elements and in that one of the receiver or transmitter inductance elements, which is located in a position of maximum coupling with the data line, is selected on the basis of the position of the object measured for path guidance at each point in time and in that the selected receiver or transmitter inductance element is used for receiving or transmitting a data signal at each point in time.

* * * * *